United States Patent [19]

McGee et al.

[11] 3,728,000

[45] Apr. 17, 1973

[54] DOOR ASSEMBLY FOR CARTRIDGE TAPE PLAYER

[75] Inventors: Paul D. McGee, Medinah; Marcus M. Artner, Chicago, both of Ill.

[73] Assignee: Motorola, Inc., Franklin Park, Ill.

[22] Filed: Mar. 27, 1972

[21] Appl. No.: 238,631

[52] U.S. Cl. ..........................312/9, 40/28.6, 16/137, 312/234.1, 179/100.11

[51] Int. Cl. ..............................................A47b 81/06

[58] Field of Search..............234/9, 10, 234.1, 234.3, 234.5; 179/100.11, 100.2 R, 100.2 Z; 40/28.6

[56] References Cited

UNITED STATES PATENTS 977,961 12/1910 McCaskey.........................312/234.1

1,072,870 9/1913 Raster...................................40/28.6

2,662,975 12/1953 Schwarz....................179/100.11 UX 2,749,635 6/1956 Robbins.............................40/28.6 X

*Primary Examiner*—James C. Mitchell

*Attorney*—Vincent J. Rauner et al.

[57] ABSTRACT

A door assembly for a cartridge type tape player having a front panel or escutcheon with a cartridge receiving opening therein includes a door member mounted swingably within said cartridge receiving opening. The door member includes a curved end portion upon which the door is mounted for rotation behind the front panel. The curved end is aligned with a plurality of windows in the front panel portion. Indicia, indicating the function of controls adjacent the windows, are provided at predetermined locations on the curved end portion of the door so that upon opening the door in response to the insertion of a cartridge into the cartridge receiving opening, the curved end portion is rotated to align the indicia with corresponding windows. The indicia thereby are made visible to one viewing the front panel of the tape player during the operation thereof.

4 Claims, 4 Drawing Figures

DOOR ASSEMBLY FOR CARTRIDGE TAPE PLAYER

BACKGROUND

This invention relates generally to cartridge type tape players and more particularly to a door assembly for use in such a tape player for covering the cartridge receiving opening of the player.

Conventionally in cartridge type tape players, the front panel of the unit includes a swingable door which covers a cartridge receiving aperture or opening in the tape player, and controls used to adjust volume, balance, tone, etc. The last-mentioned controls are usually labeled as such so that one operating the tape player knows what function is provided by each control.

The presence of the indicia on the front panel of the tape player which describe the function of the controls is necessary only when a cartridge is inserted into the cartridge receiving opening within the player and is not required when the player is not in use and a cartridge is not present. In fact, aesthetically, the appearance of the player would be enchanced if the indicia were not visible when a cartridge was removed from the player and the cartridge door was closed.

SUMMARY

Accordingly, it is an object of the present invention to provide a cartridge type tape player having a plurality of controls mounted on the front panel thereof and indicia describing the control functions adjacent the controls which appear when a cartridge is received in the player and disappear when the cartridge is removed therefrom.

It is another object of the present invention to provide a cartridge player of the above described type including a door member swingable between closed and open positions which controls the appearance and disappearance of the control function indicia.

Briefly, a preferred embodiment of a tape cartridge player according to the invention includes a front panel having controls for operating a player extending outwardly from the panel along the top portion thereof. A full width door member covers a lower cartridge receiving opening in the front panel and elongated windows in the front panel are provided between the controls and door member to display indicia which describe the function of each of the controls positioned thereabove.

A swingable door member is mounted to cover the cartridge receiving opening in the front panel. The door member includes a curved end portion along the upper edge thereof and is mounted for rotation about a rod or pin member extending through the curved portion. The curved end is positioned behind and with respect to the elongated windows in the front panel. Indicia are provided at predetermined locations on the curved end portion so that upon closing the door over the cartridge receiving opening, the indicia do not appear in the elongated windows but upon swinging the door open in response to the insertion of a cartridge into the cartridge receiving opening, the curved end is rotated to position the indicia with respect to the windows for exposure therethrough to one viewing the front panel of the player.

DETAILED DESCRIPTION

Figure 1:
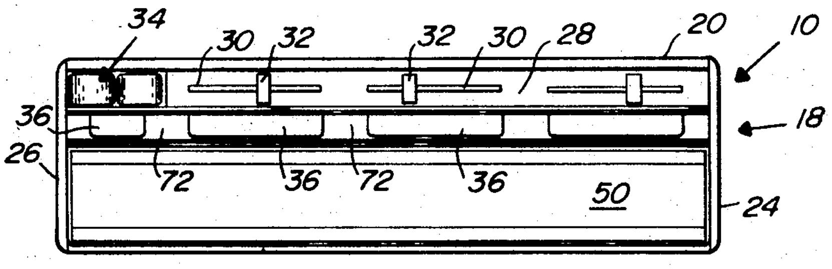
FIG. 1 is a front view of a cartridge type tape player including a door assembly according to the invention, shown in a closed position for covering the cartridge receiving opening.
Figure 2:
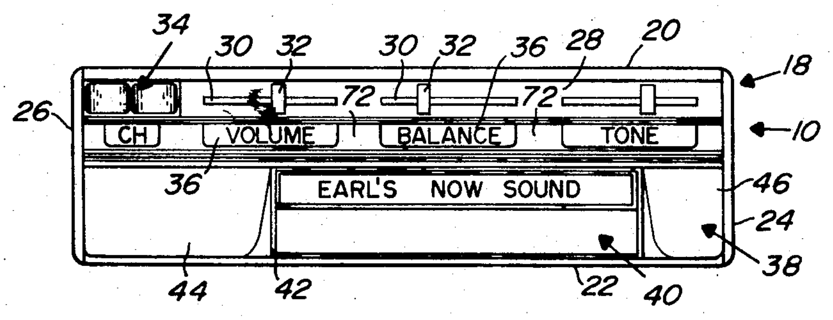
FIG. 2 is a front view of the cartridge tape player of FIG. 1 shown with the door assembly in the opened condition with a cartridge received in the cartridge receiving opening.
Figure 3:
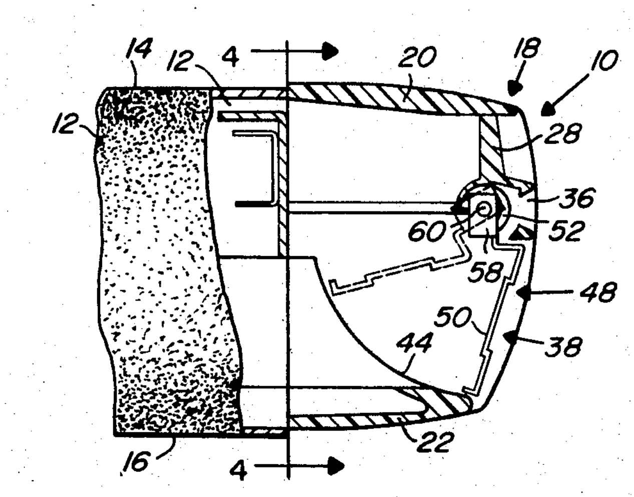
FIG. 3 is a fragmentary, side sectional view of the cartridge tape player of FIG. 1.

Referring now to the drawing in greater detail wherein like numerals have been employed throughout the various views to designate similar components, there is shown in FIGS. 1–3 a cartridge type tape player designated generally by the numeral 10.

The tape player 10 includes an outer housing having side walls, such as 12 (FIG. 3), a top wall 14 and a bottom wall 16. A front escutcheon or the like 18 is provided which is attachable to the housing with suitable fasteners (not shown). The tape player further includes, within the housing, the usual cartridge receiving tunnel or cavity and tape playing instrumentalities (not shown).

Escutcheon 18 includes a top wall portion 20, a bottom wall portion 22, side wall portions 24, 26 joining the latter and a front wall portion 28. The front wall portion of the escutcheon has a plurality of slots or elongated openings such as 30, formed therein through which controls such as 32 for adjusting volume, balance, etc., extend. Mounted adjacent the controls 32 is an illuminated area 34 for use in indicating the track or channel which is being played back by the tape player.

Directly beneath the last-mentioned indicator light area 34 and controls 32, are windows such as 36 (see FIG. 3). The windows, as will be described hereinafter, provide openings through which labeling indicia for the controls and indicator 34 can be seen from the front of the player.

Beneath the windows 36, there is a large opening 38 through which tape cartridges such as 40 are inserted into the tape player. A smaller opening 42 (FIG. 2) within the escutcheon, of a dimension similar to that of tape cartridge 40, is provided for actual receipt of the tape cartridge. Ramp portions 44, 46 formed integrally with the escutcheon on either side of opening 44 are provided as guides to permit accurate insertion of a tape cartridge into the opening 42.

A door assembly designated generally by the numeral 48 is provided in the escutcheon 18. The assembly 48 includes a door member 50 dimensioned similarly to the cartridge receiving opening 38 provided in front wall 28 thereof. The upper edge 52 of the door member is curved back on itself and divided into sections 51, 53, 55, 57. An elongated pin or rod member 54 upon which the door is mounted is received in the curved sections. Bent ears 56, 58 at the ends of the door member 50 are provided and have apertures such as 60 (FIG. 3) therethrough for receiving the ends of elongated pin member 54. The ends of the pin member extend outwardly beyond the bent ears 56, 58, into slots 62, 64 (FIG. 4) provided in the inner surfaces of side wall portions 24, 26, respectively, of the escutcheon 18.

Figure 4:
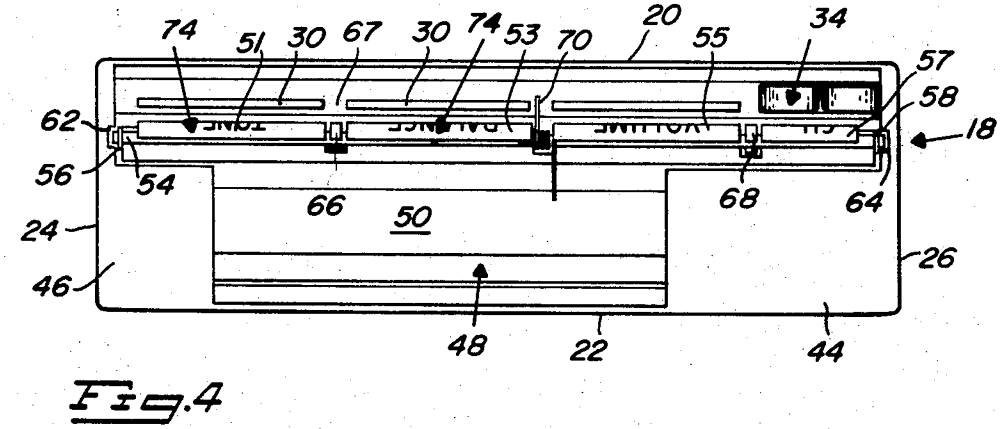
FIG. 4 is a sectional view of the front panel portion of the tape player of FIG. 3 taken along the line 4-4 thereof.

Mounting tabs 66, 68 are provided on the inside surface 67 of the front wall portion 28 of escutcheon 18 (FIG. 4). Pin member 54 is secured to the front wall surface 67 by the tabs to maintain the door 50 mounted on escutcheon 18. The door member 50 is supported at the ends thereof by bent ears 56, 58, and is rotatable about pin member 54. A spring member 70 wrapped about the pin member 54 between sections 53, 55 of door member 50, and engaging the inner wall surface 67 and door member, provides a biasing force to maintain the door member in a normally closed position over opening 38, as shown in solid lines in FIG. 3. Spring 70 and tabs 66, 68 are hidden from view from the front of the player by divider material such as 72, (FIGS. 1 and 2) provided between windows 36.

Along each of the curved sections 51, 53, 55, 57 of the door member 50, there is provided labeling or indicia such as 74, to indicate the function of a corresponding control member extending from the front wall portion of escutcheon 18. The indicia are printed on the curved sections of the door member 50 at predetermined locations so that when the door member is in a normally closed position, such as in FIGS. 1 and 4 and as shown in solid lines in FIG. 3, the indicia are not visible from the front of the player. Instead, blank areas of the curved sections 51, 53, 55, 57 are aligned with respective windows 36.

Upon the opening of door member 50 by the insertion of a tape cartridge 40 into the opening or otherwise, the door member is swung about end sections 51, 53, 55, 57 on pin member 50 to an opened position, as shown in dotted lines in FIG. 3. The swinging of door member 50 to an open position causes curved sections 51, 53, 55, 57 to be rotated to align the indicia printed thereon with corresponding windows 36. Thus, when door member 50 is open, the indicia appear in windows 36 from the front of the player to indicate to one operating the tape player the functions of each of the controls, etc.

Upon withdrawal of the cartridge 40 from the player, spring 70 causes door member 50 to be swung back to a closed position, whereby the curved sections 51, 53, 55, 57 are rotated to their normal positions and the indicia thereon are removed from view through windows 36.

Thus, the door assembly according to the invention provides a relatively simple means for providing indicia by which one operating the tape player wherein the door assembly is used, understands the function of the controls of the player only when necessary; i.e., when a cartridge is inserted into the player. The door assembly likewise enhances the tape player appearance aesthetically by removing unnecessary writing or labeling when the player is not in use.

While a full width door member 50 has been shown and described in the player embodiment illustrated in the drawing, such a door member is not absolutely necessary according to the invention. The portion of the door covering the aperture 38 need only be of a width to cover the entry opening 42 for the tape cartridge 40. In the latter case, the sections 51, 53, 55, 57 only would extend the full width of escutcheon 18. In the alternative, the tape player controls could be mounted within the width of opening 42 also.

While a particular embodiment of the invention has been shown and described, it should be understood that the invention is not limited thereto since many modifications may be made. It is therefore contemplated to cover by the present application any and all such modifications as fall within the true spirit and scope of the appended claims.

We claim:

1. In a cartridge type tape player having a front panel portion, a plurality of control members provided on said panel portion, windows formed in said panel portion adjacent the control members for displaying indicia describing the function of a corresponding control member and a cartridge receiving opening adjacent said windows on the side opposite said control members, a swingable door member covering said cartridge receiving opening, said door member being mounted for rotation about one end thereof behind said panel portion, said one end having indicia thereon positionable with respect to the windows in said panel portion so that upon the opening of said door member to reveal said cartridge receiving opening, said indicia are aligned with said windows for viewing through said panel portion, said indicia being moved out of alignment with said windows upon the closing of said door member.

2. A cartridge type tape player as claimed in claim 1 wherein said one end of said door member is curved back on itself to provide a curved surface whereon said indicia are provided at predetermined locations, and wherein the portion of said curved surface not including said indicia is aligned with said windows when said door member is in the closed position and said indicia are aligned with said windows upon rotation of said door about said curved portion to an open position.

3. A cartridge type tape player as claimed in claim 2 further including a pin member extending through said curved end portion of said door member and coupled to said front panel portion, said curved end portion being rotatable about said pin member to swing said door member between closed and opened positions and a spring member engageable with said door member for maintaining the latter in a normally closed position over said cartridge receiving opening.

4. A cartridge type tape player as claimed in claim 3 wherein the curved end portion of said door is divided into a plurality of sections, each of which is aligned with a predetermined one of said windows in said front panel, and wherein said front panel portion includes mounting tabs extending from the inner surface thereof for attaching said pin member thereto.

* * * * *